July 31, 1962   J. L. ASH II, ET AL   3,046,799
ADJUSTABLE RATIO TRANSMISSION
Filed Feb. 23, 1961   2 Sheets-Sheet 1
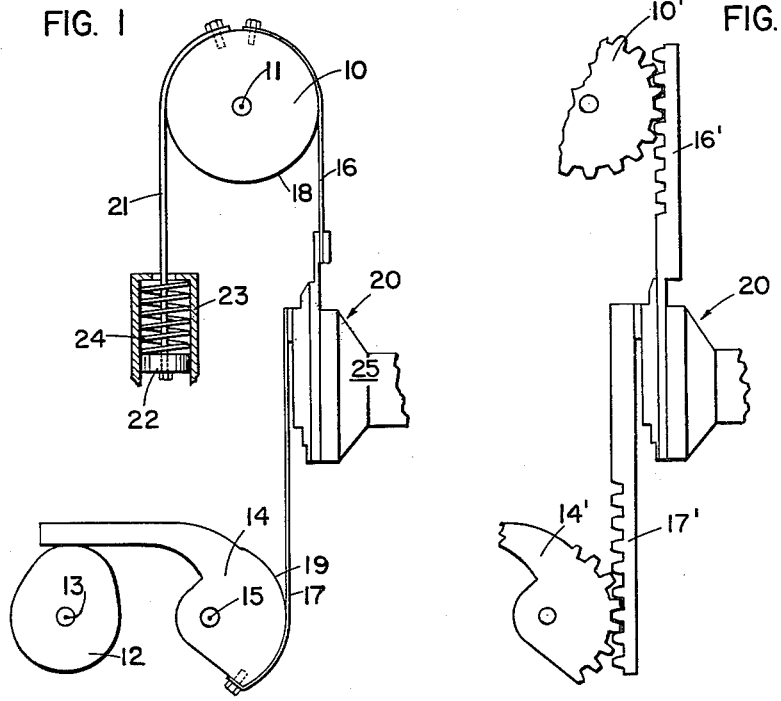
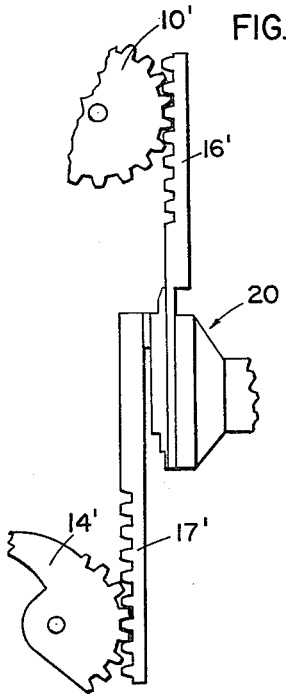
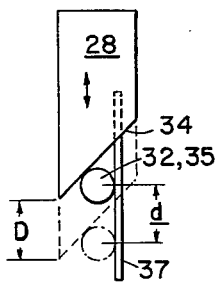
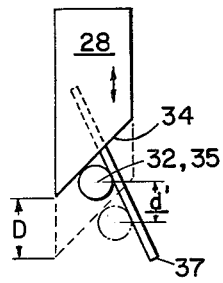
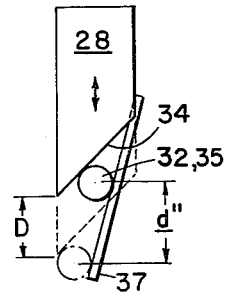
INVENTORS
JOHN L. ASH II
HARRY PEDERSEN
BY
*Richard W. Treverton*
ATTORNEY

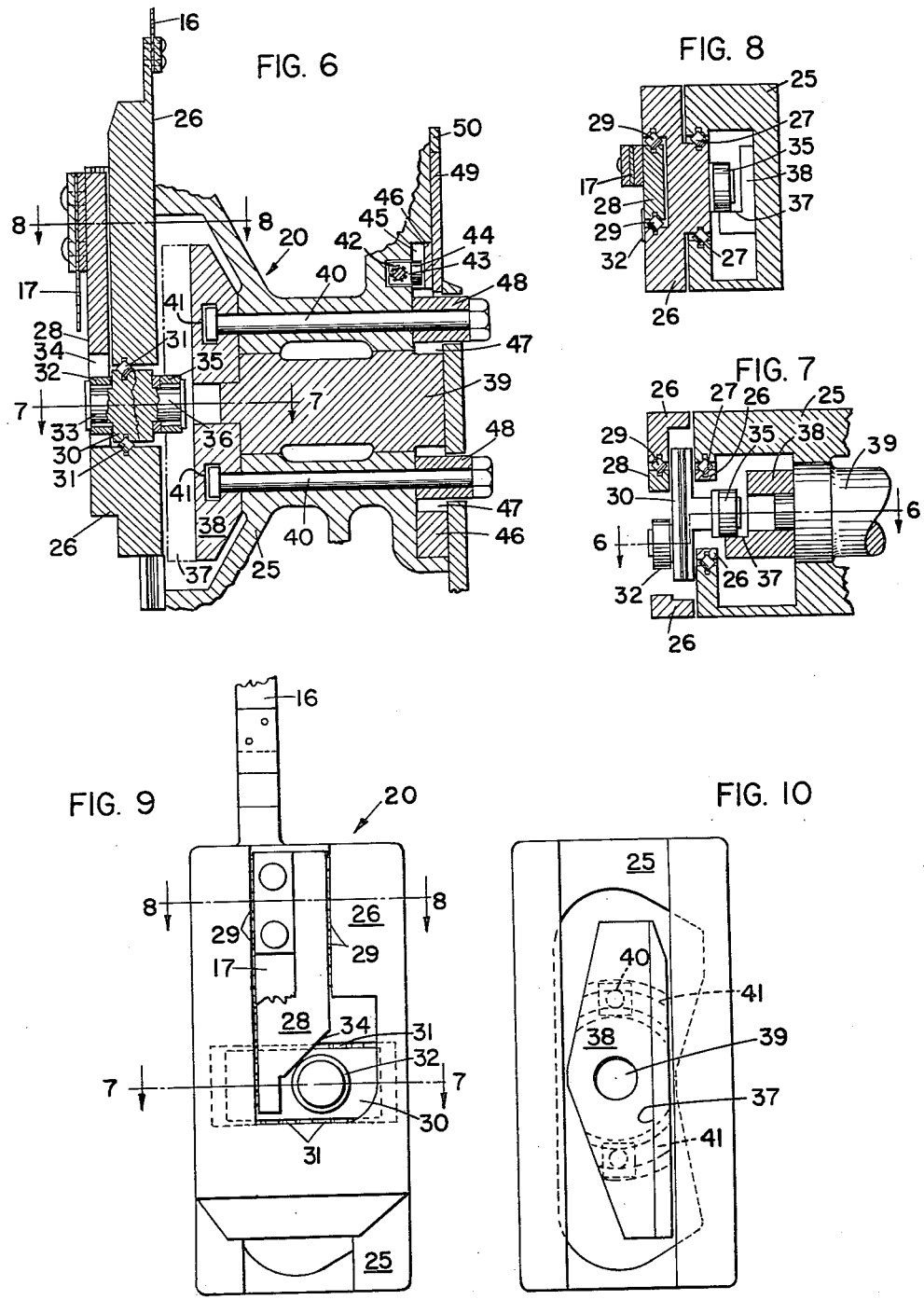

United States Patent Office 3,046,799
Patented July 31, 1962

3,046,799
ADJUSTABLE RATIO TRANSMISSION
John L. Ash II and Harry Pedersen, Rochester, N.Y., assignors to The Gleason Works, Rochester, N.Y., a corporation of New York
Filed Feb. 23, 1961, Ser. No. 91,026
11 Claims. (Cl. 74—25)

The present invention relates to an adjustable ratio transmission which in any position of adjustment will transmit motion in constant velocity ratio.

A transmission according to the invention comprises a support, first and second slides supported for rectilinear motion on said support, a cross-slide movable rectilinearly on the first slide, a straight guide member having a guide follower member in guided relation therewith, one of said members being on the cross-slide and the other one of them being on the second slide, said straight guide member extending at an acute angle to the path of the cross-slide on the first slide, and a straight guide adjustable angularly on the support and in guided relation to a guide follower member on the cross-slide, said rectilinear motions of the three slides being in planes perpendicular to the axis of the angular adjustment.

Preferred embodiments of the invention are shown in the accompanying drawings, wherein:

FIG. 1 is a diagrammatic side view of a transmission employing flexible tapes;

FIG. 2 is a fragmentary side view of a modification employing rack-and-gear means instead of the flexible tapes;

FIGS. 3, 4 and 5 are diagrammatic views to illustrate the effect of the ratio-adjustment means of the transmission;

FIG. 6 is a vertical sectional view on a larger scale of a portion of the mechanism shown in FIGS. 1 and 2, the planes of the view being designated 6—6 in FIG. 7;

FIGS. 7 and 8 are plan sectional views, primarily in the respective planes designated 7—7 and 8—8 of FIGS. 6 and 9;

FIG. 9 is a front view of the mechanism shown in FIG. 6, in a plane perpendicular to that view;

FIG. 10 is a view in a plane parallel to FIG. 9, with a portion of the mechanism removed.

The transmission may be used in various places where it is desired to transmit oscillatory or reciprocatory motion at constant velocity ratio, and where it is desirable or necessary that the transmission ratio be adjustable. The embodiments illustrated were designed especially for driving the cradle of a bevel gear generating machine of the general kind shown in Patent No. 2,444,551 to O. F. Bauer, but they are not limited to this specific use.

Referring to FIG. 1, 10 is a disc adapted to be secured to the cutter-carrying cradle of the machine for rotation as a unit therewith about axis 11; 12 is a cradle drive cam rotatable about axis 13 by a suitable motor drive (not shown); and 14 is a cam follower rotatable about axis 15. Flexible elements in the form of steel tapes 16 and 17 respectively extend partially around cylindrical surfaces 18 and 19 of the disc and the cam follower, the ends of the tapes on the latter parts being secured thereto, as shown. The tapes extend tangentially from the cylindrical surfaces and their extending ends are secured to a ratio-varying device designated 20. Another flexible element, 21, is connected at one end to the cylindrical surface 18 of disc 10 and at the opposite end to a plunger 22 that is slidable in a cylinder 23 and is backed by pressure exerting means comprising a spring 24. The cylinder 23 and the axes 11 and 15 are fixed with respect to the support part 25 of device 20. The spring acts constantly to urge counterclockwise motion of disc 10 and, through tapes 16 and 17, which it maintains under tension, also urges counterclockwise motion of cam follower 14 and thereby holds the latter against the cam 12. Rotation of the cam, whether unidirectional or reversing, serves to oscillate follower 14 about axis 15, and also, through the tapes, to oscillate disc 10 about axis 11.

Referring especially to FIGS. 6 to 10, the device 20 includes a slide 26 supported for vertical motion on the support 25 by roller bearings 27 arranged to roll along straight vertical raceways in the two parts, 25, 26. The rollers are cylindrical and alternate ones of each series have their axes inclined at ninety degrees to each other. Another slide, 28, is supported for vertical motion on slide 26 by similar roller bearings 29 adapted to roll in straight vertical raceways in the slides. The tapes 16 and 17 are respectively secured to these slides 26 and 28. A cross-slide 30 is movable horizontally on slide 26 on roller bearings 31, the latter being in raceways in the slides 26, 30. A guide follower comprising a roller 32 is supported on needle bearings on a stub shaft 33 on the front of the cross-slide, and has rolling contact with inclined straight guide face 34 of slide 28. A similar guide follower comprising a roller 35 is supported on needle bearings on stub shaft 36 on the back of the cross-slide 30. This roller has rolling contact with a straight guide 37 that is formed as a flange on a member 38. The latter is rigidly secured to the forward end of a shaft 39 journaled for rotation in support 25. The spring 24, by its action of maintaining the tapes 16 and 17 under tension, serves to hold the rollers 32, 35 against their respective guides 34, 37.

Member 38 is clamped to the support 25 by bolts 40 having heads engaged in circular T-slots 41 in the member. Upon loosening of the bolts the shaft 39 and the member may be adjusted angularly about the shaft axis to vary the inclination of guide 37 and thereby vary the transmission ratio. Such adjustment is effected by manual rotation of a screw 42, FIG. 6, which is rotatable in support 25. A nut 43 threaded onto the screw carries a roller 44 that is engaged in a radial slot 45 in a flange 46 on the outer end of shaft 39. The flange has openings 47 for passing the bolts 40 and spacer sleeves 48. Secured respectively to the flange and the support 25 are plates 49 and 50 bearing graduations to show the position of angular adjustment of the guide 37, preferably in terms of transmission ratio or of adjustment angle.

The effect of the adjustment is shown in FIGS. 3 to 5. When the guide 37 is vertical as in FIG. 3 (and also in FIG. 10), i.e. parallel to the direction of motion of slide 28, the rollers 32, 35 move vertically in unison with the slide, so that for any vertical displacement D of the slide to the position shown in broken lines they will have an equal vertical displacement d. Inasmuch as the rollers are carried by the slide 26, the latter will also have a vertical displacement equal to d. If the guide 37 is now adjusted to the position shown in FIG. 4, wherein the angle which it forms with guide 34 is larger, the result is that for a displacement D of slide 28, the rollers 32, 35 and the slide 26 will have a smaller vertical displacement d'. If, on the other hand, the guide 37 is adjusted as shown in FIG. 5 to a position wherein the angle which it makes with guide 34 is decreased, a displacement D of slide 28 will cause a greater displacement d" of the rollers 32, 35 and slide 26.

Inasmuch as the guides 34, 37 are straight, and the slides 26, 28 and 30 move rectilinearly, the motions of the two slides will be in constant velocity ratio in any given position of angular adjustment of guide 37. Also, since angular displacements of members 10 and 14 about axes 11 and 15 are proportional to rectilinear displacements of the ends of the tapes 16 and 17 connected to the slides, the angular velocities of the members 10 and 14 will also be constant in ratio in any position of guide adjustment. Such adjustment does not release the pressure exerted by spring 24, so that the slides 26, 28 remain operably connected during adjustment. Accordingly the phase relation existing between members 10 and 14 is not disturbed. As shown in FIGS. 6 and 7, the axis of roller 35 preferably is aligned with that of shaft 39 in a mean or middle position of the angular motions of members 10 and 14, so that, if guide 37 is adjusted when member 14 is stationary in such mean position, no motion of the slides will occur during the adjustment.

The mechanism may be modified in various ways within the purview of the invention, and without departing from the scope of the appended claims. As one example the tapes 16, 17 may be replaced, as shown in FIG. 2, with racks 16', 17' meshing with gear teeth provided on the disc 10' and on the cam follower 14'. Either means of the same kind shown at 12 and at 21–24 in FIG. 1, or functionally equivalent means, may be employed respectively for driving the member 14' and for biasing the member 10' in a counterclockwise direction about its axis to maintain the rollers 32, 35 in contact with their guides.

Having now described the improved mechanism and its mode of operation, what is claimed is:

1. An adjustable ratio transmission comprising a support, first and second slides supported for rectilinear motion on said support, a cross-slide movable rectilinearly on the first slide, a straight roller guide member having a roller member in rolling contact therewith, one of said members being on the cross-slide and the other one of them being on the second slide, said straight roller guide member extending at an acute angle to the path of the cross-slide on the first slide, and a straight roller guide adjustable angularly on the support and in rolling contact with a roller member on the cross-slide, said rectilinear motions of the three slides being in planes perpendicular to the axis of the angular adjustment.

2. A transmission according to claim 1 in which the roller member in contact with the adjustable roller guide is an entity separate from the roller member in contact with said roller guide member.

3. A transmission according to claim 2 in which said roller members are both mounted on the cross-slide.

4. A transmission according to claim 1 in which the axis of angular adjustment is aligned with the axis of the roller member which contacts the adjustable guide when the first and second slides are in one position of operation.

5. A transmission according to claim 1 in which the first and second slides are rectilinearly movable in parallel paths and the cross-slide is movable relative to the first slide in a direction perpendicular to said paths.

6. A transmission according to claim 1 in which the first slide is mounted on said support and the second slide is mounted on the first slide.

7. A transmission according to claim 1 in which there are two members each having a cylindrical surface and each mounted for angular motion about the axis of its cylinder axis which is in fixed relation to said support, each of said two members having a flexible element secured upon its cylindrical surface, said elements extending tangentially from said surfaces and being respectively connected to said first and second slides.

8. A transmission according to claim 7 having pressure exerting means for biasing one of said two members angularly in one direction about its axis, for maintaining said elements under tension and maintaining said rolling contact, and drive means for effecting angular oscillation of the other one of said two members about its axis.

9. A transmission according to claim 1 in which there are two gears each having a rack meshing therewith, the axes of the gears being in fixed relation to said support, the racks being connected respectively to the first and second slides for movement therewith.

10. A transmission according to claim 9 having pressure exerting means for biasing one gear rotatively in one direction, for maintaining said rolling contact.

11. An adjustable ratio transmission comprising a support, first and second slides supported for rectilinear motion on said support, a cross-slide movable rectilinearly on the first slide, a straight guide member having a guide follower member in guided relation therewith, one of said members being on the cross-slide and the other one of them being on the second slide, said straight guide member extending at an acute angle to the path of the cross-slide on the first slide, and a straight guide adjustable angularly on the support and in guiding relation to a guide follower member on the cross-slide, said rectilinear motions of the three slides being in planes perpendicular to the axis of said angular adjustment.

References Cited in the file of this patent
UNITED STATES PATENTS

| | | |
|---|---|---|
| 694,028 | Protheroe | Feb. 25, 1902 |
| 2,404,639 | Lane | July 23, 1946 |
| 2,859,630 | Hatch | Nov. 11, 1958 |
| 2,949,790 | Foss | Aug. 23, 1960 |